United States Patent [19]

Herbst

[11] Patent Number: 4,458,575

[45] Date of Patent: Jul. 10, 1984

[54] METHOD OF AUTOMATIC TARGET TRACKING OF AN AIRCRAFT

[75] Inventor: Wolfgang Herbst, Putzbrunn, Fed. Rep. of Germany

[73] Assignee: Messerschmitt-Bölkow-Blohm Gesellschaft mit beschränkter Haftung, Munich, Fed. Rep. of Germany

[21] Appl. No.: 239,019

[22] Filed: Feb. 24, 1981

[30] Foreign Application Priority Data

Mar. 5, 1980 [DE] Fed. Rep. of Germany ....... 3008424

[51] Int. Cl.³ .............................................. F41G 3/22
[52] U.S. Cl. ................................... 89/1 A; 89/41 EA
[58] Field of Search .............. 89/1 A, 41 EA, 41 SW; 244/75 R, 83 R

[56] References Cited

U.S. PATENT DOCUMENTS 2,426,744  9/1947  Pontius et al. .................... 89/41 EA
2,933,980  4/1960  Moore et al. ..................... 89/41 SW
4,020,324  4/1977  Buscher et al. ................... 89/41 EA Primary Examiner—Charles T. Jordan
Attorney, Agent, or Firm—Toren, McGeady and Stanger

[57] ABSTRACT

A method of aligning an aircraft fuselage axis with an air or ground target, while maintaining a predetermined flight path, involves turning the fuselage around the yaw axis and the transverse axis relative to the flight path. In performing the fuselage turn a side-slip angle is effected by vertical rudder control and superposed thereon is an oppositely directed roll angle. The actuation of the flight control for the fuselage turn is coupled with the fire control system of the aircraft.

1 Claim, 5 Drawing Figures

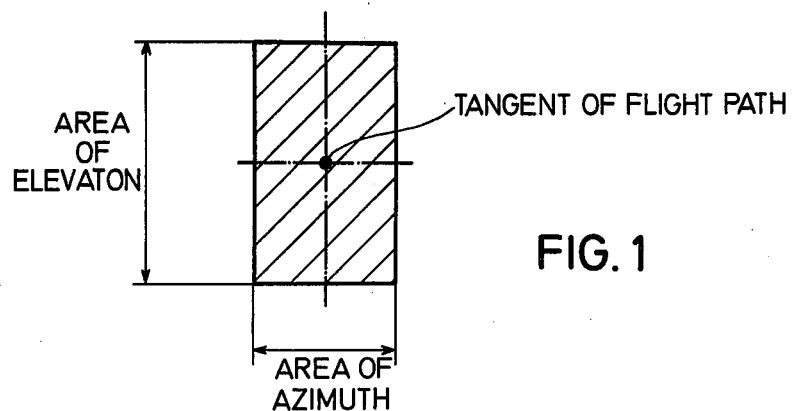
FIG. 1
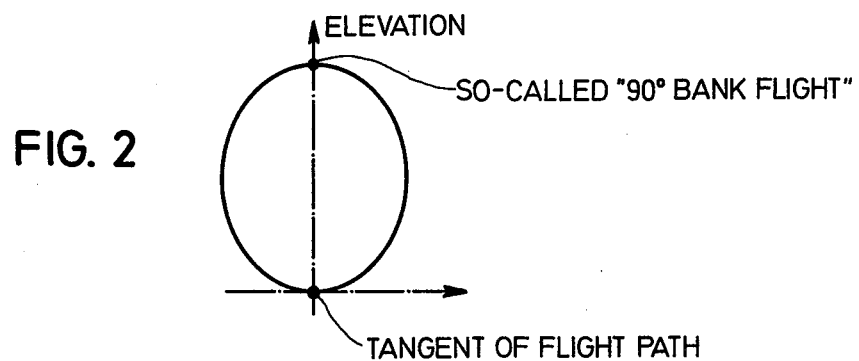
FIG. 2
FIG. 3A  FIG. 3B  FIG. 3C
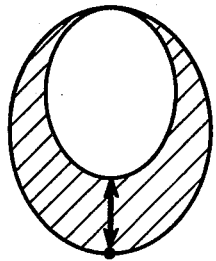 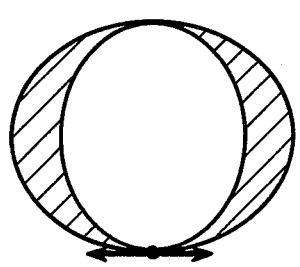 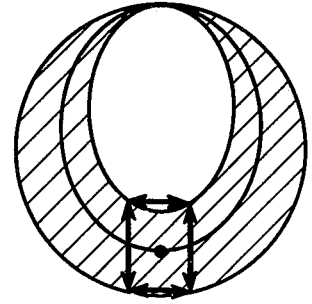

METHOD OF AUTOMATIC TARGET TRACKING OF AN AIRCRAFT

The invention relates to a system for the automatic tracking of an aircraft fuselage axis with the purpose of aligning the aircraft longitudinal axis with an air or ground target.

In combat against air or ground targets with airborne armament the overall capability of this weapon system has been improved by coupling the fire control system with flight controls in such a way that the target—over a specified range—can be automatically tracked.

This well-known system itself has been further improved so that by deviating from conventional coordinated flight maneuvers said corrective maneuvers can be carried out by having the fuselage axis—independently from the flight path in azimuth and altitude—turn over a specified range and brought in alignment with the target.

However, most aircraft types can carry out maneuvers as these not at all or only to an insignificant extent and then only if additional control surfaces are arranged for establishing a roll- and lateral force-slip environment.

The object of the invention is to create a system of the initially described type, with which an alignment of the aircraft longitudinal axis with an air or ground target can be implemented even with air-craft having only a conventionally minor fuselage guidance potential, without having to input direct lift- and lateral forces through special rudder arrangements. This problem is solved in a surprisingly reliable way by the measures indicated in the patent claim. In the following description the proposed system is described and explained with reference to an exemplified embodiment.

The drawing is provided for a better understanding of the described exemplified embodiment, wherein FIG. 1 is a sketch on the axial intersection of an aircraft with the angular range, within which a target can be engaged in combat without having to change its flight path;

FIG. 2 is a sketch for clarification of the so-called "slip maneuver,"

FIG. 3a a sketch for clarifying the system according to the invention for getting into a planar fuselage-guidance range with only an azimuth-wise fuselage turn;

FIG. 3b a sketch according to FIG. 3a with a fuselage turn in elevation only;

FIG. 3c a sketch according to FIG. 3a with a fuselage turn in both azimuth and elevation.

In combat against air or ground targets by aircraft through the latter's airborne armament, specifically airborne cannon and machine guns, etc., the hit probability and firing positional time can be improved in a prior art-disclosed way, where the fire- and flight control systems are so coupled that the target—as previously mentioned—is automatically tracked over a specified range. Conventional aircraft, however, can carry out maneuvers as these not at all or in any case in a quite negligible way because to effect flight path-independent turns requirements call for a set angle-independent lift modification in the pitch plane. Usually this is done by flaps, spoilers or movable parts of the entire wing. Furthermore, requirements for a flight path-independent turn in the yawing plane call for the generation of moment-free lateral forces or lateral-force free moments. But for this purpose additional control surfaces are required, such as rudder units on the fuselage frontal parts.

Generally, the capability of an aircraft for carrying out this type of flight path-decoupled slip maneuver can be described by an angular range according to FIG. 1, within which a target can be engaged without having to change or correct the flight path. With a given independence of lift- and lateral forces this firing range is a rectangular plane.

The system according to the invention in effect is that lateral forces are generated by superposing an additional roll angle, which is done by tilting the lift force of the wing. For example, in order to turn the aircraft fuselage axis to the left this is initiated by means of a matching vertical rudder deflection. This way a lateral force is generated, which is compensated for by a roll matching it to the right. The loss in lift connected with this is compensated for by boosting the angle of attack. This, however, couples the azimuthal swing with the elevation swing, and a locus is generated for a flightpath-independent fuselage-axial solid angle as is shown in FIG. 2. Each point of this locus matches a flight directional, the socalled "sideslipping" state.

To obtain a planar fuselage target range now according to the invention the "slip maneuver" shown in FIG. 2 is superposed by the fuselage axis-angular segment shown in FIG. 1, namely, this can be done either the azimuthal way only, the elevational way only, or the azimuthal-combined with-the-elevational way. The selection is made according to the given possibilities of the respective aircraft configuration. This way now a respective sickle-shaped fuselage target area is generated, as shown in FIGS. 3a, 3b, and 3c. Within these fuselage target ranges a heading can be made for any fuselage position. Meaning that vertical-rudder deflection produced sideslip angles are superposed by a counter-roll angle in such a way that any sideslip produced lateral forces are compensated for and the preset flight path is constantly maintained; thereby this flight directional state is superposed by a lift-independent fuselage swing around the lateral axis, or a lateral force free fuselage swing around the lateral axis, or a lateral force free fuselage swing around the yaw axis, or both together in such a way that above described sickle-shaped respective fuselage target range is generated. Maneuvers as these now are to be automatically carried out by way of coupling fire control and flight control systems.

The advantage of this proposed system over the fully decoupled fuselage swing without any roll-angular modification as shown in FIG. 1 is that on the one hand with a given fuselage target plane (as shown in FIG. 1)—that is, with azimuthal and elevational targets—said fuselage target plane is substantially expanded by the proposed roll superposition. On the other hand, an about equal fuselage target plan can be obtained by a substantially reduced decoupled fuselage target authorization—as symbolized by the plane drawn into FIG. 1—and furthermore, in any given case an aximuth- or elevation slewing capability can be relinquished. But in any of the above cases rudder planes are saved, and the result is a substantially greater flexibility in design shaping or conceptualization.

I claim:

1. Method of aligning an aircraft fuselage axis with an air or ground target while maintaining a predetermined flight path wherein the aircraft has a flight control system and a fire control system comprising turning the fuselage around the yaw axis and the transverse axis relative to the flight path by one of direct lateral force control and direct lifting control wherein the improvement comprises in carrying out the fuselage turn effecting a side-slip angle by vertical rudder control and superposing thereon an oppositely directed roll angle, and coupling the actuation of the flight control for the fuselage turn with the fire control system of the aircraft.

* * * * *